United States Patent [19]

Angus et al.

[11] 4,453,620

[45] Jun. 12, 1984

[54] AUTOMATIC SAFETY BRAKE ACTUATION TONGUE FOR TOWED VEHICLES

[75] Inventors: William G. Angus, Ames, Iowa; Richard D. Rathe, Peoria; Daniel J. Fox, Galva, both of Ill.

[73] Assignee: Iowa State University Research Foundation, Inc., Ames, Iowa

[21] Appl. No.: 357,883

[22] Filed: Mar. 15, 1982

[51] Int. Cl.³ .................................................. B60T 7/20
[52] U.S. Cl. ................................................. 188/112 R
[58] Field of Search ....................... 188/3 R, 3 H, 112; 280/446 A

[56] References Cited

U.S. PATENT DOCUMENTS 2,916,107 12/1959 Huentelman ..................... 188/112
3,077,248 2/1963 Wayt ................................ 188/112

*Primary Examiner*—Duane A. Reger

*Attorney, Agent, or Firm*—Zarley, McKee, Thomte, Voorhees & Sease

[57] ABSTRACT

A tongue is provided for a towed wagon having conventional variable hydraulic and emergency brake systems. The tongue has three telescopically disposed tubes with a clevis on the outer tube for connection to a drawbar. A slide member is moved in said outer tube by a connected drawbar. The slide member has a cam which engages a spring loaded plunger which engages a latch on the intermediate tube to lock the outer and intermediate tubes together. The connected drawbar also moves the outer and intermediate tubes with respect to each other before they are locked together. This relative movement causes an emergency brake control means to be released, and moves to its breaking position only when the drawbar is disconnected. A surge brake mechanism is interconnected between the intermediate and inner tubes to operate the variable hydraulic brake system of the vehicle as the inner tube moves forwardly over the intermediate tube.

7 Claims, 8 Drawing Figures

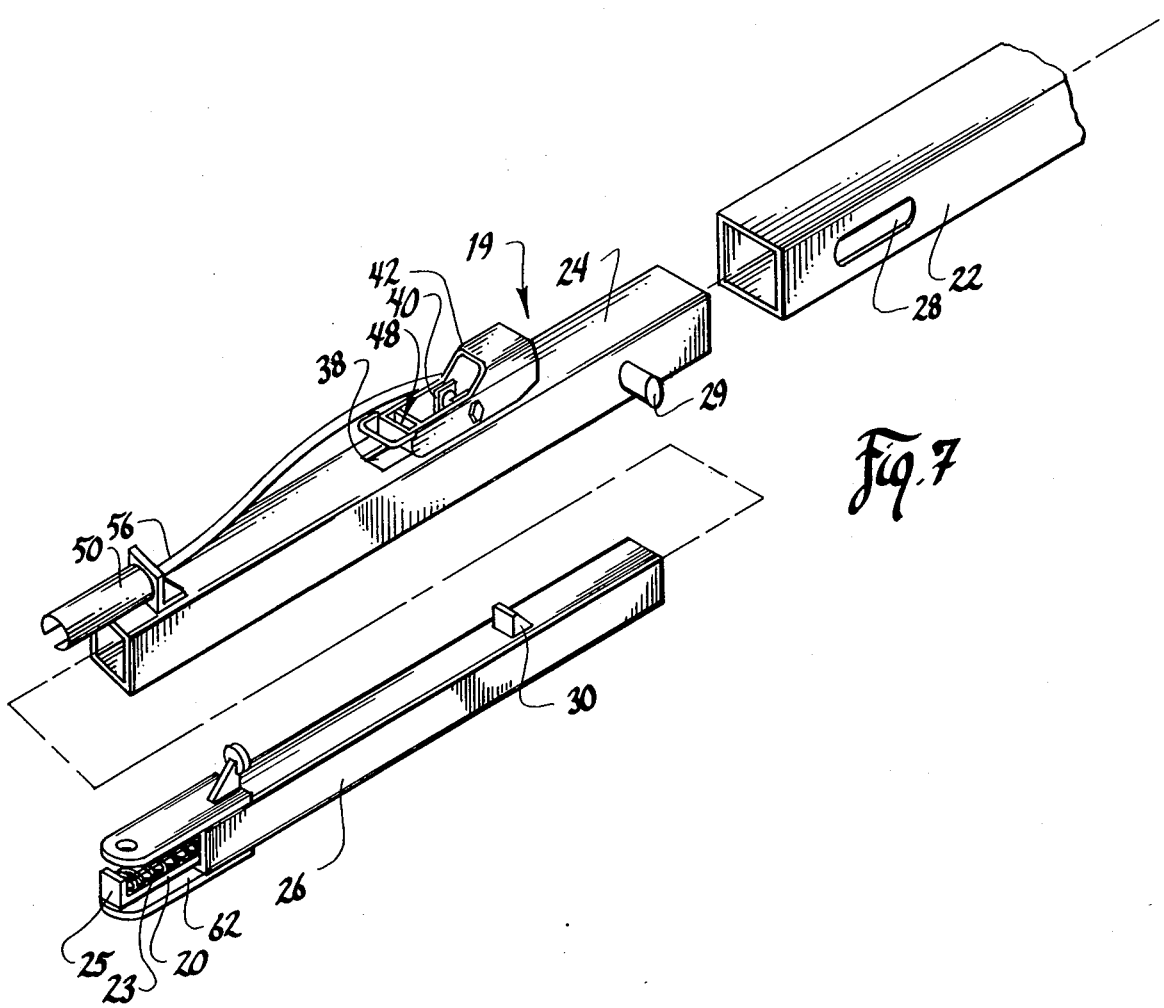
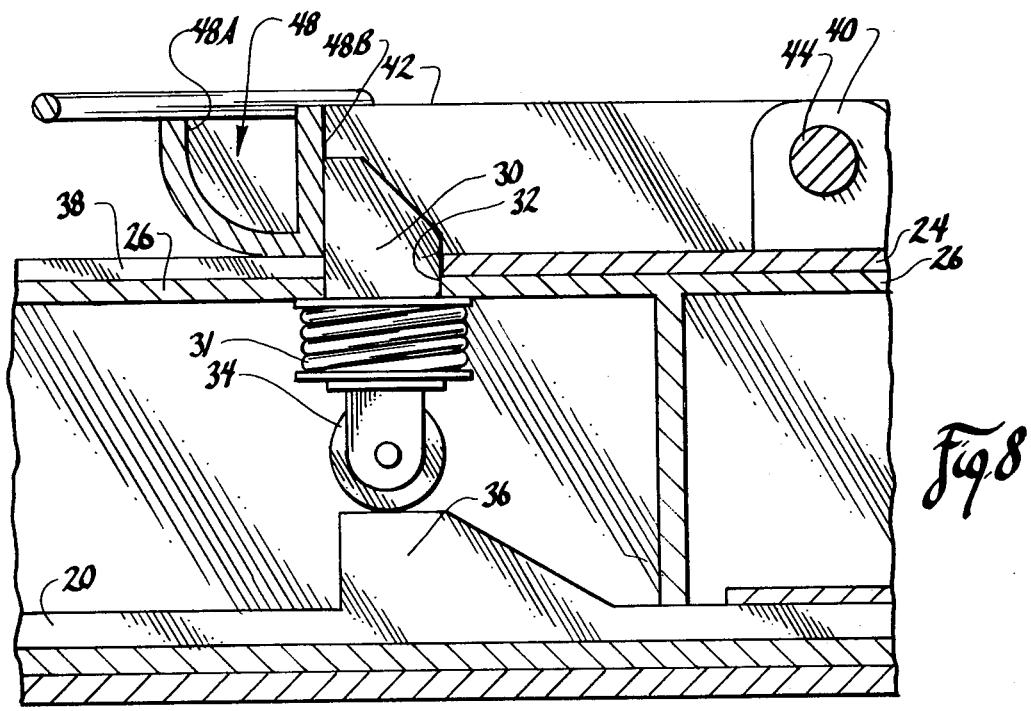

AUTOMATIC SAFETY BRAKE ACTUATION TONGUE FOR TOWED VEHICLES

BACKGROUND OF THE INVENTION

Farm accidents usually go unreported unless there is a personal injury. Many farm accidents do occur during the transportation of grain. The potential accidents caused by an unhooked wagon parked on a hillside, or a wagon breaking loose during transport are too great to be overlooked. While it is true that brakes are now available for farm wagons, many operators do not take the time to use them properly during busy harvesting operations, or inexperienced operators may not know how to use them properly.

Today's large tractors can pull one or two fully loaded wagons, each with 400 or more bushel capacity, at transport speeds. But, the operator must be able to stop the rig within safe limits. If the wagon has no brakes, the whole stopping burden falls on the tractor (or truck). Problems do develop on downgrades or slippery surfaces, even for large tractors, and if the tractor is considerably lighter than the loaded wagon, stopping is difficult and dangerous. Going up or down grades is also a concern. The tractor must have the power, weight, traction, and braking ability to control the load. It must not be "overwhelmed" on descents with the danger of jackknifing or being pushed off the road, and it must be able to prevent rollback when stopped on an upgrade.

The placing of brakes on wagons greatly decreases the stopping distance of the tractor and the wagon. However, the operator may not be able to manually actuate such brakes in an emergency.

Therefore, a principal object of this invention is to provide an automatic control system for the emergency and variable brake systems of a towed vehicle.

A further object of the invention is to provide means that will automatically implement the brake control system of the towed vehicle upon connection of a drawbar to the vehicle so that the operator will not have to remember to implement the system.

A still further object of the invention is to provide an automatic control system which is easily adaptable to existing brake systems of typical towed vehicles.

These and other objects will be apparent to those skilled in the art.

BRIEF SUMMARY OF THE INVENTION

A tongue for a wagon or vehicle is comprised of three telescopically arranged tubes. The outer tube includes a clevis for attachment to a drawbar. A slide mechanism adjacent the clevis is moved rearwardly by a connected drawbar to lock the two outer tubes together after the drawbar has moved the outer tube rearwardly a short increment. This is accomplished by a cam on the slide member which actuates a plunger which engages a latch on the second tube member. The rearward movement of the outer tube member serves to release an emergency control mechanism, which is reactuated when the drawbar is disconnected from the outer tube member.

A surge brake control mechanism is actuated by the relative movement of the second and third tubes which are interconnected by a dampening means.

BRIEF DESCRIPTION OF THE DRAWINGS

FIG. 7 is an exploded view of the three tube members comprising the tongue; and

FIG. 8 is an enlarged scale sectional view of the interconnection between the two outer tube members.

DESCRIPTION OF THE PREFERRED EMBODIMENTS

Figure 1:
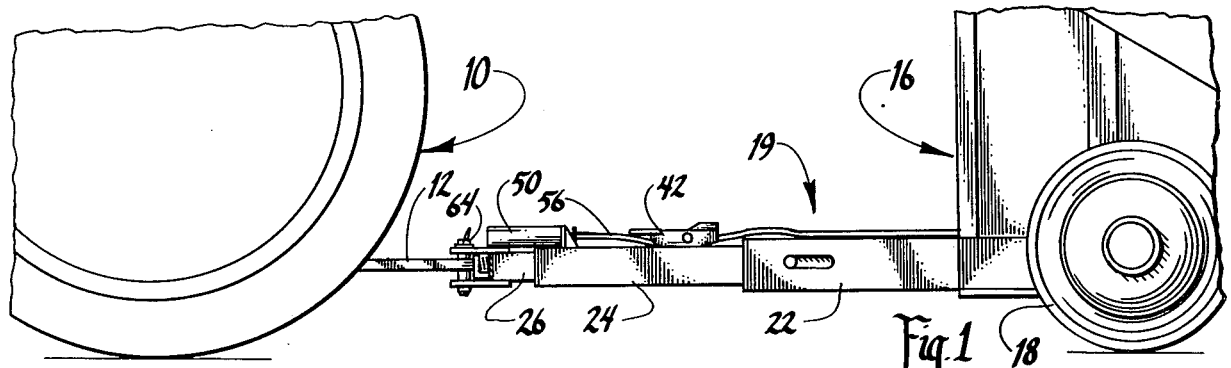
FIG. 1 is a side elevational view of the device of this invention connected to a farm tractor.
Figure 2:
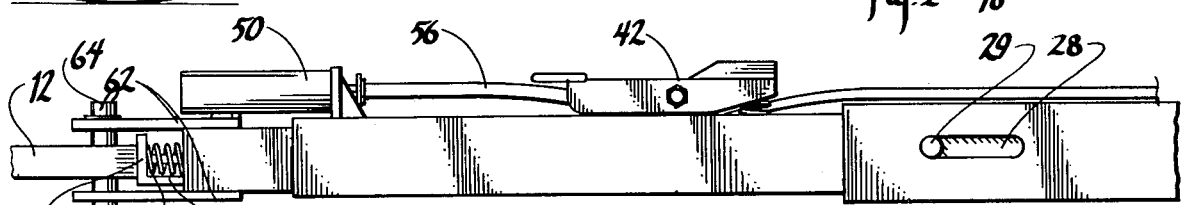
FIG. 2 is an enlarged scale elevational view similar to a portion of FIG. 1.

The numeral 10 designated a prime mover, such as a tractor, with a conventional drawbar 12 having a vertical aperture 14. The numeral 16 designates a conventional wagon or trailer with wheels 18. Wagon 16 has a conventional parking brake system and conventional hydraulic wheel brakes which have not been shown.

Tongue 19 includes telescopically arranged square tube members 22, 24 and 26. Tube 22 is operatively connected to wagon 16, and has slots 28 in opposite sides thereof. Pin 29 is rigidly secured to the sides of tube 24, and slidably extends through slots 28 to permit some relative movement between tubes 22 and 24.

An enlongated slide member 20 is located within tube 26. The forward end thereof terminates in upwardly extending flange 25 which is spaced from flange 27 (FIG. 3) on tube 26. A compression spring assembly 23 is positioned between flanges 25 and 27 and is operatively secured thereto. Spring 23 normally positions slide member 20 with respect to tube 26 as shown in FIG. 4.

A spring 31 surrounds and is secured by its lower end to plunger 30 and is secured at its upper end to the inner top wall of tube 26 around aperture 32. Spring 31 urges plunger 30 to slidably penetrate aperture 32. A cam wheel 34 is secured to the lower end of plunger 30, and is adapted to engage cam 36 at times. When cam wheel 34 engages cam 36, plunger 30 extends through elongated slot 38 in the top of tube 24 (FIG. 7).

Ears 40 (FIGS. 3, 4 and 5) extend upwardly from tube 24. Latch 42 is pivotally secured to ears 40 by pin 44. A spring 46 on the lower end of latch 42 maintains the latch in the position shown in FIGS. 1-4. A latch element 48 is on the forward end of latch 42 and is arcuately shaped on its forward portions 48A, with a vertical wall 48B on the rearward portion (FIG. 8).

A horizontal tube 50 is secured to the upper forward end of tube 24. A spring 52 within the tube 50 is secured to rod 54 which slidably extends through wagon 16 and is operatively secured by linkage 56 to the conventional emergency brake thereon.

A surge brake tube 58 is secured within tube 22 just rearwardly of the rearward end of tube 24. Spring and rod mechanism (not shown) within the tube 58 is secured at its forward end to plunger 60 which extends through the forward end of tube 58. Spring and rod mechanism is operatively secured to a hydraulic means adapted to actuate the conventional hydraulic brake of wagon 16 when plunger 60 engages the rear end of tube 24 as shown in FIG. 4.

A clevis 62 on the forward end of the tube 26 is adapted to embrace drawbar 12. Pin 64 is adapted to conventionally secure clevis 62 and drawbar 12 together.

FIG. 4 illustrates the pre-connection and postconnection positions of the various components. The surge brake components are inoperative so that the hydraulic brakes of the wagon are released, but the emergency brake is applied through the expanded spring 52. To connect the drawbar 12 to the tongue 19, the tractor 10 is backed towards the tongue so that drawbar 12 engages flange 25 to compress spring 23, whereupon pin 64 may then be inserted through clevis 62 and aperture 14 in drawbar 12.

As drawbar 12 moves flange 25 and slide member 20 rearwardly to compress spring 23 cam 36 engages cam wheel 34 to raise plunger 30 through the slot 38 in tube 24. Further compression of spring 23 exerts rearward longitudinal pressure on flange 27 of tube 26 which causes tube 26 to move rearwardly within tube 24. The upper end of plunger 30 then engages the arcuate forward end 48A of latch 42 and causes the latch to pivot upwardly on pin 44 so that the plunger 30 can press thereunder to assume the position of FIG. 8. The engagement of plunger 30 with vertical wall 48B of latch 42 locks tube 26 to tube 24 in the position of FIG. 3.

The relative movement of tube 26 in tube 24, as described above, to achieve the position of FIG. 3, causes the spring 52 and rod 54 to move from the positions of FIG. 4 to FIG. 3 which serves to release the emergency brake of wagon 16.

Figure 3:
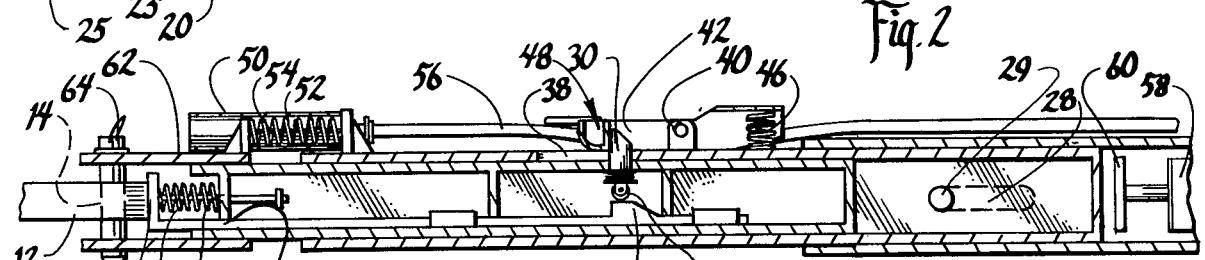
FIG. 3 is a longitudinal sectional view of the structure of FIG. 2.
Figure 4:
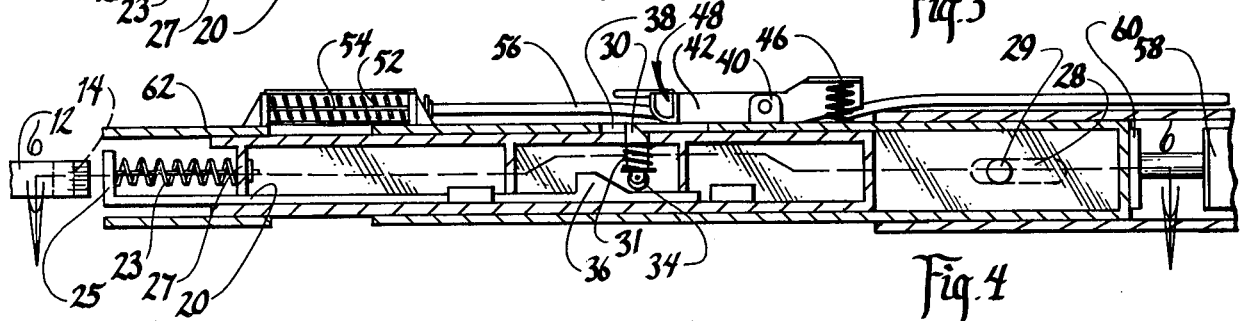
FIG. 4 is a sectional view similar to that of FIG. 3 but with the components in a drawbar disconnected position.
Figure 5:
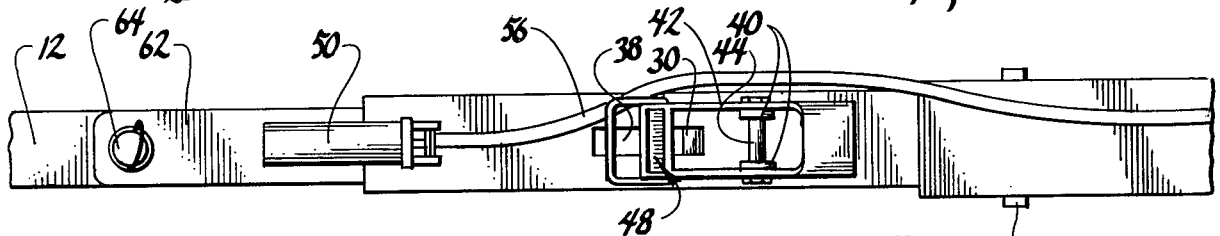
FIG. 5 is a top plan view of the structure of FIG. 3.
Figure 6:
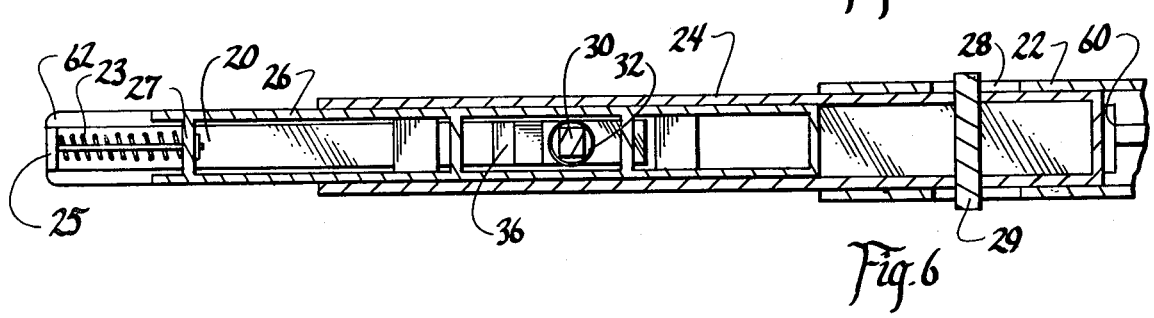
FIG. 6 is a sectional view taken on lines 6—6 of FIG. 4.

Under normal non-surge pulling conditions, the tubes 22 and 24 are in the relative position shown in FIG. 3 with pin 29 being in the forward ends of slots 28 and with the hydraulic brake of the wagon being released. If the wagon tends to over-run or move forwardly with respect to the tractor, tube 22 slides forwardly on tube 24 through the connection of pin 29 in slots 28. This causes plunger 60 to engage the rearward end of tube 24 as shown in FIG. 4. As plunger 60 is forced rearwardly, the hydraulic brake cylinder (not shown) is progressively actuated to apply appropriate braking for wagon 16. Whenever plunger 60 separates from its contact with tube 24 (i.e. FIG. 6), the hydraulic brakes of the wagon 16 will be released.

If ever the tractor drawbar 12 and wagon tongue become separated, (by accident or intent), spring 23 moves slide member 20 forward to move cam 36 to the position of FIG. 4. Spring 31 withdraws plunger 30 from vertical wall 48B of latch 42. Spring 52 then moves tube 24 rearwardly from the position of FIG. 3 to FIG. 4, whereupon rod 54 causes the emergency brake of the wagon to be actuated to stop or prevent any movement of the wagon 16.

From the foregoing, it is seen that both the hydraulic and emergency brakes of the wagon will be automatically actuated to suit the conditions of operation, whereupon the objects of the invention are achieved.

I claim:

1. In combination with a wheeled vehicle having a brake system, comprising,
    a tongue secured to said vehicle for towing the vehicle,
    a drawbar connecting means on the forward end of said tongue,
    a slide member on said tongue adjacent said connecting means and being movable between first and second positions,
    resilient means on said tongue to yieldably hold said slide member in said first position,
    brake control means on said tongue connected to said brake system and being movable between a braking position and a release position,
    said slide member being operatively connected to said brake control means so that when said slide member is in said first position, said brake control means is in its braking position, and vice versa,
    and said slide member being so positioned with respect to said drawbar connecting means that said slide member will be moved from said first position to said second position when a drawbar is connected to said drawbar connecting means.

2. The combination of claim 1 wherein said tongue includes at least first and second telescopically positioned tubes, said slide member being slidably mounted on said first tube, said brake control means being connected to said second tube; the connection of a drawbar to said drawbar connection means moving said slide member from said first position to said second position, and moving said tubes from a first position to a second position, a releasable connecting means between said first and second tubes, said slide member operative with said releasable connecting means to rigidly interconnect said first and second tubes when said slide member is in said second position.

3. The combination of claim 2 wherein said releasable connecting means comprises a latch on said second tube, and an interlocking plunger engagable with said latch and being operatively connected to said slide member and said first tube.

4. The combination of claim 3 wherein said slide member has a cam to engage said interlocking plunger when said slide member is in said second position to move said interlocking plunger into a locked position with respect to said latch.

5. The combination of claim 1 wherein said resilient means is a spring.

6. The combination of claim 3 wherein said latch is pivotally secured to said second tube to permit said interlocking plunger to move under said latch into locking condition therewith as said tubes move from said first position to said second position.

7. The combination of claim 2 wherein a third tube is secured to said wagon and is telescopically secured to said second tube member, dampening means between said first and second tube members to restrict the free movement therebetween between first and second positions, a variable brake system on said vehicle, and means on said tongue to actuate said variable brake system of said vehicle when said second and third tubes are in said second position.

* * * * *